US011746707B2

(12) United States Patent
Bemment

(10) Patent No.: US 11,746,707 B2
(45) Date of Patent: *Sep. 5, 2023

(54) GEARED GAS TURBINE ENGINE

(71) Applicant: ROLLS-ROYCE plc, London (GB)

(72) Inventor: Craig W Bemment, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,158

(22) Filed: Aug. 16, 2022

(65) Prior Publication Data

US 2022/0389875 A1    Dec. 8, 2022

Related U.S. Application Data

(63) Continuation of application No. 17/231,676, filed on Apr. 15, 2021, now Pat. No. 11,448,137, which is a
(Continued)

(30) Foreign Application Priority Data

Mar. 1, 2019   (GB) ..................... 1902795

(51) Int. Cl.
*F02C 7/36*       (2006.01)
*F01D 15/12*    (2006.01)
(Continued)

(52) U.S. Cl.
CPC ............... *F02C 7/36* (2013.01); *F01D 15/12* (2013.01); *F01L 15/12* (2013.01); *F02C 3/113* (2013.01)

(58) Field of Classification Search
CPC .... F02C 7/32; F02C 7/36; F02C 3/107; F02C 3/113; F01D 15/12; F02K 3/06; F02K 3/075; F05D 2260/40311
See application file for complete search history.

(56) References Cited

U.S. PATENT DOCUMENTS 5,197,857 A * 3/1993 Glynn ................... F04D 29/321
                                                         416/210 A
6,431,837 B1* 8/2002 Velicki .................. F04D 29/324
                                                         416/223 R
(Continued)

FOREIGN PATENT DOCUMENTS

EP      3 372 808 A2     9/2018
EP      3008323 B1      11/2021

OTHER PUBLICATIONS

Konsatntinos G. Kyprianidis et al., "Multi-Disciplinary Analysis of a Geared Fan Intercooled Core Aero-Engine". Proceeding of ASME Turbo Expo, GT2013-95474, Jun. 2013.
(Continued)

*Primary Examiner* — Brian P Wolcott
(74) *Attorney, Agent, or Firm* — Oliff PLC

(57) ABSTRACT

The present disclosure relates to a geared gas turbine engine for an aircraft. Example embodiments include a gas turbine engine for an aircraft including: an engine core having a turbine, a compressor, and a core shaft connecting the turbine to the compressor; a fan located upstream of the engine core, the fan having a plurality of fan blades; and a gearbox that receives an input from the core shaft to drive the fan at a lower rotational speed than the core shaft, the gearbox having a gear ratio of around 3.4 or higher, wherein the gas turbine engine is configured such that a jet velocity ratio between a first jet velocity exiting from a bypass duct of the engine and a second jet velocity exiting from an exhaust nozzle of the engine core is within a range from around 0.75 to around 0.82.

20 Claims, 3 Drawing Sheets

Related U.S. Application Data continuation of application No. 16/443,942, filed on Jun. 18, 2019, now Pat. No. 11,002,194.

(51) Int. Cl.
*F01L 15/12* (2006.01)
*F02C 3/113* (2006.01)

(56) References Cited

U.S. PATENT DOCUMENTS

| | | | | |
|---|---|---|---|---|
| 10,001,062 | B2* | 6/2018 | Warnet | F01D 25/12 |
| 10,794,294 | B1* | 10/2020 | Dunning | F02K 3/06 |
| 2014/0205438 | A1* | 7/2014 | Hasel | F02C 7/36 |
| | | | | 415/124.1 |
| 2015/0027101 | A1* | 1/2015 | Hasel | F02C 7/36 |
| | | | | 60/226.1 |
| 2016/0010590 | A1* | 1/2016 | Rolt | F02K 1/15 |
| | | | | 60/805 |
| 2017/0175675 | A1* | 6/2017 | Sabnis | F02K 3/075 |
| 2017/0191548 | A1* | 7/2017 | Fisher | F16H 57/08 |

OTHER PUBLICATIONS

Abhijit Guha, "Optimum Fan Pressure Ratio for Bypass Engines With Separate or Mixed Exhaust Streams". Journal of Propulsion and Power, vol. 17, No. 5, pp. 1117-1122, Sep.-Oct. 2001.

H. Zimmermann et al."A Numerical Investigation Into the Nozzle Flow of High By-Pass Turbofans." The American Society of Mechanical Engineers, 92-GT-10 (1992—year of publication sufficiently early that the month is not relevant).

Nicholas Cumpsty. "Jet Propulsion", The Press Syndicate Of The University of Cambridge, pp. 31 and 32, 1997 (year of publication sufficiently early that the month is not relevant).

P.P. Walsh and P. Fletcher. "Gas Turbine Performance", Blackwell Science Ltd, pp. 223, 256 and 281, 1998 (year of publication sufficiently early that the month is not relevant).

* cited by examiner

GEARED GAS TURBINE ENGINE

This application is a Continuation of U.S. application Ser. No. 17/231,676 filed Apr. 15, 2021, which is a Continuation of U.S. application Ser. No. 16/443,942 filed Jun. 18, 2019, which is based upon and claims the benefit of priority from British Patent Application No. 1902795.2 filed Mar. 1, 2019, the entire contents of the prior applications being incorporated herein by reference.

The present disclosure relates to a geared gas turbine engine for an aircraft.

Turbofan gas turbine engines for aircraft propulsion have many design factors that affect the overall efficiency and power output or thrust. To enable a higher thrust at a high efficiency, a larger diameter fan may be used. As the diameter of the fan is increased, however, the required lower speed of the fan tends to conflict with the requirements of the turbine component the core shaft is connected to, typically a low pressure turbine. A more optimal combination can be achieved by including a gearbox between the fan and the core shaft, which allows the fan to operate at a reduced rotational speed at higher efficiency, and therefore enables a larger size fan, while maintaining a high rotational speed for the low pressure turbine, enabling the overall diameter of the turbine to be reduced and a greater efficiency to be achieved with fewer stages.

A high propulsive efficiency for a geared gas turbine engine is achieved through a high mass flow through the engine. This may be enabled in part by increasing the bypass ratio of the engine, which is the ratio between the mass flow rate of the bypass stream to the mass flow rate entering the engine core. To achieve a high bypass ratio with a larger fan while maintaining an optimum gearing ratio and fan speed, the size of the engine core, in particular the low pressure turbine, may need to increase, which would make integration of a larger fan engine underneath an aircraft wing more difficult. A general problem to be addressed therefore is how to achieve a high propulsive efficiency for a larger geared gas turbine engine while enabling the engine to be integrated with an aircraft.

According to a first aspect there is provided a gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft to drive the fan at a lower rotational speed than the core shaft, the gearbox having a gear ratio of around 3.4 or higher,
wherein the gas turbine engine is configured such that a jet velocity ratio between a first jet velocity through a bypass duct of the engine and a second jet velocity through the engine core is within a range from around 0.75 to around 0.82 at cruise conditions.

An advantage of configuring the engine so that the jet velocity ratio is within the above range is that a high bypass ratio can be maintained, enabling the engine to be efficient with a low specific thrust, and maintaining a high gearing ratio so that the size of the engine core can be kept small. The rotational speed of the low pressure turbine of the engine core can therefore be kept high, enabling it to be kept smaller, which avoids problems with integration of the engine under an aircraft wing.

The gear ratio of the gearbox enables the fan to rotate more slowly than the low pressure turbine of the engine core. As the gear ratio increases, the advantage of having a gearbox decreases due to the increased losses in the gearbox and increased wear resulting from components such as planetary gears that need to be smaller and rotate faster. The gear ratio may therefore advantageously be around 5.0 or 4.5 or less, i.e. resulting in a range for the gear ratio of between around 3.4 to around 5.0 or around 4.5.

To preserve propulsive efficiency, the kinetic energy difference between the cold and hot stream jets, i.e. the jets from the bypass and core exhaust, should be minimised. Decreasing the jet velocity ratio below around 0.75 will tend to reduce propulsive efficiency and therefore have an increased detrimental effect on fuel burn rate. The jet velocity ratio may therefore be kept within a range from around 0.75 to around 0.82.

According to a second aspect there is provided a gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft to drive the fan at a lower rotational speed than the core shaft, the gearbox having a gear ratio of between around 3.2 and around 3.8, optionally around 3.3 to around 3.8,
wherein the gas turbine engine is configured such that a jet velocity ratio between a first jet velocity through a bypass duct of the engine and a second jet velocity through the engine core is within a range from around 0.75 to around 1.0 at cruise conditions.

The jet velocity ratio, $R_J$, may be defined as:

$$R_J = \frac{V_B C_B}{V_C C_C \eta_{LPT} \eta_F}$$

where $V_B$ is the fully expanded first jet velocity, $C_B$ is a thrust coefficient of the bypass nozzle, $V_C$ is the fully expanded second jet velocity, $C_C$ is a thrust coefficient of the core exhaust nozzle, $\eta_{LPT}$ is an isentropic efficiency of a lowest pressure turbine of the engine core and $\eta_F$ is an isentropic efficiency of compression of air into the bypass duct by the fan. The fully expanded jet velocity may be defined as the axial jet velocity at the point where the exhaust jet has expanded to ambient pressure. The term nozzle thrust coefficient ($C_B$ and $C_C$) as used herein has the standard meaning in the art, as understood by the skilled person.

The gearbox may be an epicyclic gearbox comprising an input sun gear connected to the core shaft, a plurality of planetary gears connected by a carrier arm and an outer annulus ring, the fan being connected to the carrier arm. Alternatively, the gearbox may be an epicyclic gearbox comprising an input sun gear connected to the core shaft, a plurality of planetary gears connected by a carrier arm and an outer annulus ring, the fan being connected to the outer annulus ring.

The fan may have an outer diameter of between around 320 cm and around 400 cm. In some examples the fan may have an outer diameter of between around 330 cm and around 370 cm.

In some examples, where the turbine is a first turbine, the compressor a first compressor, and the core shaft a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a third aspect there is provided a method of operating a gas turbine engine on an aircraft, the gas turbine engine comprising:

an engine core comprising a turbine, a compressor, and a core shaft connecting the turbine to the compressor;
a fan located upstream of the engine core, the fan comprising a plurality of fan blades; and
a gearbox that receives an input from the core shaft to drive the fan at a lower rotational speed than the core shaft, the gearbox having a gear ratio of around 3.4 or higher,
wherein the method comprises operating the gas turbine engine to provide propulsion under cruise conditions such that a jet velocity ratio between a first jet velocity exiting from a bypass duct of the engine and a second jet velocity exiting from an exhaust nozzle of the engine core is within a range from around 0.75 to around 0.82

According to a fourth aspect there is provided a method of operating a gas turbine engine on an aircraft, the gas turbine engine comprising:

an engine core comprising a turbine, a compressor, and a core shaft connecting the turbine to the compressor;
a fan located upstream of the engine core, the fan comprising a plurality of fan blades; and
a gearbox that receives an input from the core shaft to drive the fan at a lower rotational speed than the core shaft, the gearbox having a gear ratio of between around 3.2 and around 3.8, optionally around 3.3 to around 3.8,
wherein the method comprises operating the gas turbine engine to provide propulsion under cruise conditions such that a jet velocity ratio between a first jet velocity exiting from a bypass duct of the engine and a second jet velocity exiting from an exhaust nozzle of the engine core is within a range of from around 0.75 to around 1.0.

The optional and advantageous features described above in relation to the first and second aspects may be applied also to the method according to the third and fourth aspects.

Cruise conditions may be defined as a forward Mach number of between 0.7 and 0.9 at an altitude of between 10000 m and 15000 m. Other conditions such as ambient temperature and pressure are largely dependent on the altitude.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example 3.2 or higher, for example in the range of from 3.2 to 5.0, for example on the order of or at least 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 and 5.0. The gear ratio may be, for example, between any two of the values in the previous sentence.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
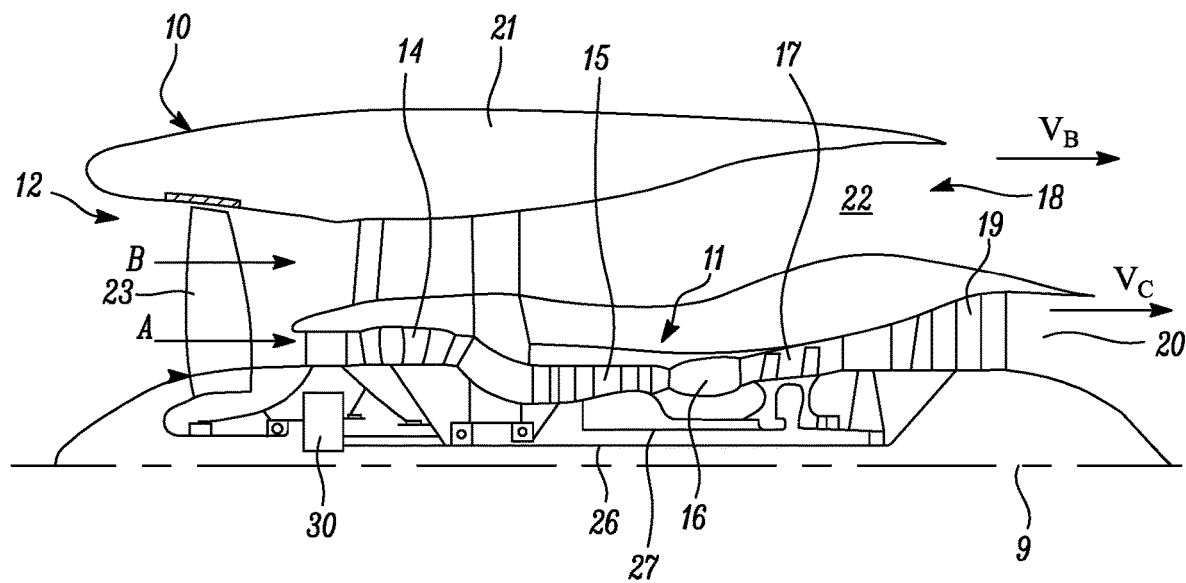
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
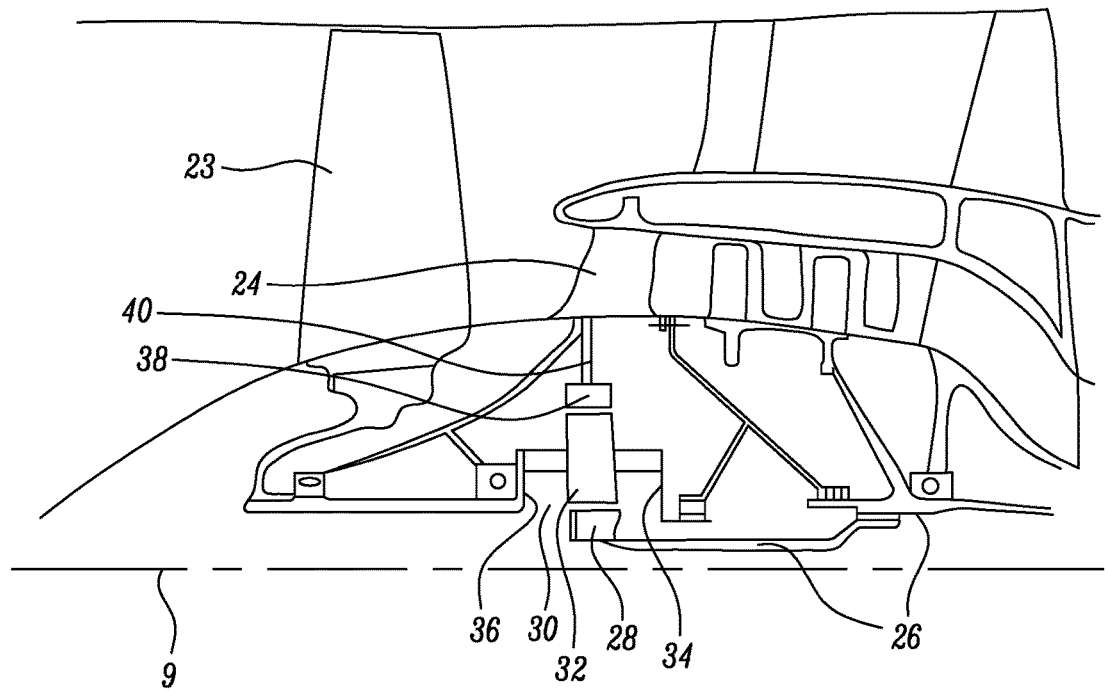
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
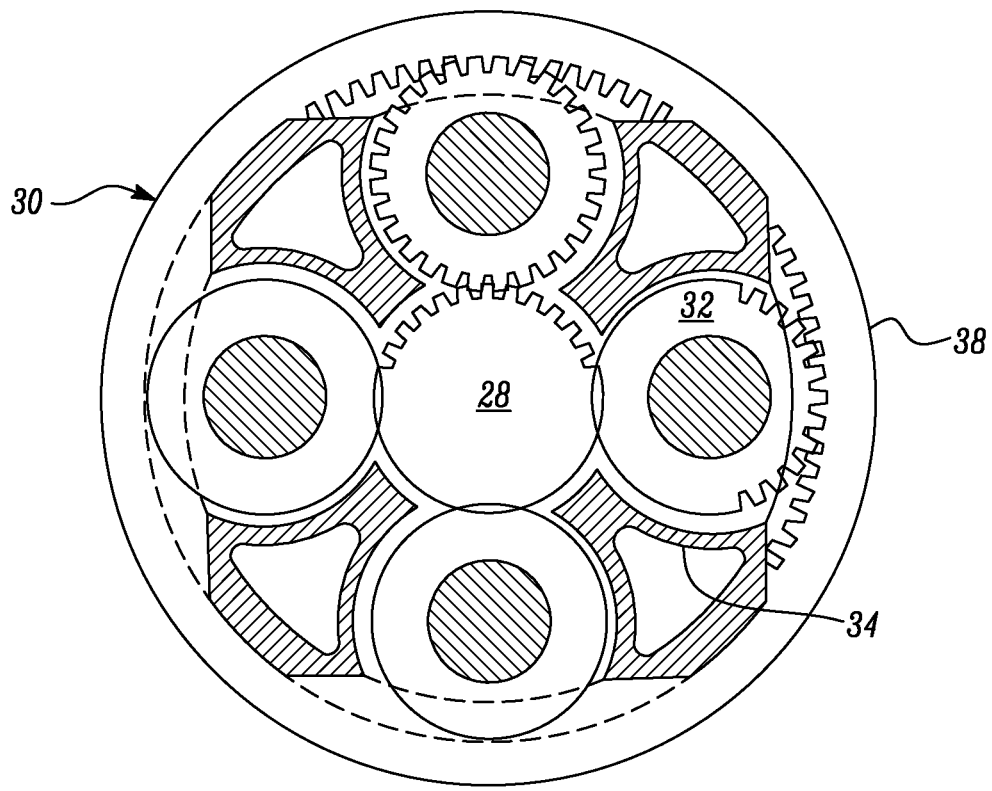
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
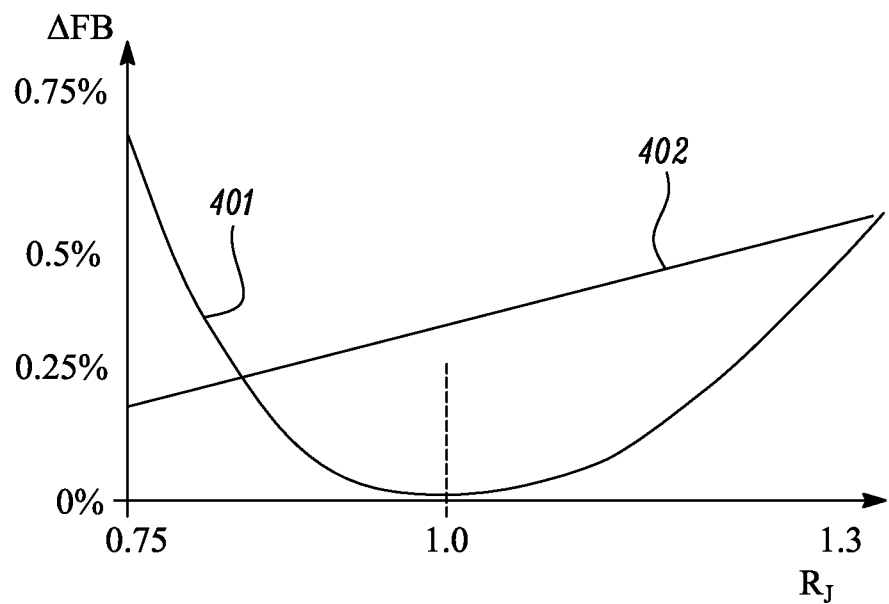
FIG. 4 is an example plot of change in fuel burn as a function of jet velocity ratio.

FIG. 4 illustrates an example plot of change in fuel burn, ΔFB, as a function of jet velocity ratio, $R_J$, other factors being constant. The change in fuel burn contribution from propulsive efficiency 401 is determined relative to an optimum value for the jet velocity ratio of around 1.0, with an increase in fuel burn above and below this value. The change in fuel burn contribution from the IP turbine, represented by line 402 in FIG. 4 (for example relative to an optimum IP turbine, which may be achieved at an very low jet velocity ratio off the left hand side of the graph) may be due to, for example, the change in weight and/or size of the IP turbine as the velocity ratio changes, other factors being constant. In this regard, an increased velocity ratio may generally result in a larger and/or heavier IP turbine, which may also have an adverse impact on the installation of the engine with the aircraft. Factors that may affect the jet velocity ratio include the relative rotational speeds of the fan and turbine and the areas of the exhaust nozzles for the bypass and core exhausts.

For a higher gearing ratio, i.e. around 3.2, 3.3, 3.4 and above, for example up to around 3.8 or in some cases even higher, the jet velocity ratio tends to be around 1.0 or below. As the jet velocity ratio decreases below 1.0, the fuel burn contribution from propulsive efficiency 401 increases, and at a higher rate than for the portion above 1.0. To maintain this loss to within around 0.5% for such an arrangement, it can be seen from FIG. 4 that the jet velocity ratio would need to be kept within around 0.8 to around 1.0, and for a jet velocity ratio of around 0.75 and below, the fuel burn contribution from propulsive efficiency becomes dominant, rising to around 0.7% and above. A lower limit for the jet velocity ratio of around 0.85 or 0.90 may be used to keep the fuel burn contribution from propulsive efficiency to around 0.25% or below. It has been found that further decreasing the jet velocity ratio enables a higher gear ratio to be used and/or decreases the pressure ratio across the IP turbine, thereby allowing for a smaller, faster and/or lighter IP turbine, reflected in a lower contribution to fuel burn loss 402 by the IP turbine. Such an IP turbine may have installation benefits when installed on an aircraft, for example in terms of the ability to better optimize the position the engine relative to a wing. A range of around 0.75 to around 1.0 or 0.75 to around 0.82 for the jet velocity ratio has been found to be advantageous for engines with higher gear ratios as defined herein.

A lower gear ratio of the gearbox typically results in values for the jet velocity ratio of 1.0 or greater. For gearboxes having such ratios, to keep the fuel burn loss due to propulsive efficiency to within around 0.5% or less of the optimum, it can be seen from FIG. 4 that the jet velocity ratio should be between around 1.0 and around 1.3. As the jet velocity ratio increases further, the increase in fuel burn contribution both from the propulsive efficiency (line 401) and from the IP turbine (line 402) becomes greater. An upper limit for the jet velocity ratio is around 1.2 keeps the increase in fuel burn due to propulsive efficiency to around 0.25-0.3%.

For a given set of gears making up an epicyclic gearbox, a planetary driving arrangement will produce a higher gearing ratio than a star driving arrangement. A star arrangement may be generally preferred in combination with a jet velocity ratio of around 1.0 and above, and a planetary arrangement may be generally preferred for a jet velocity ratio of around 1.0 and below. However, it will be appreciated that star and planetary gearboxes may be used outside of these preferred ranges.

Figure 5:
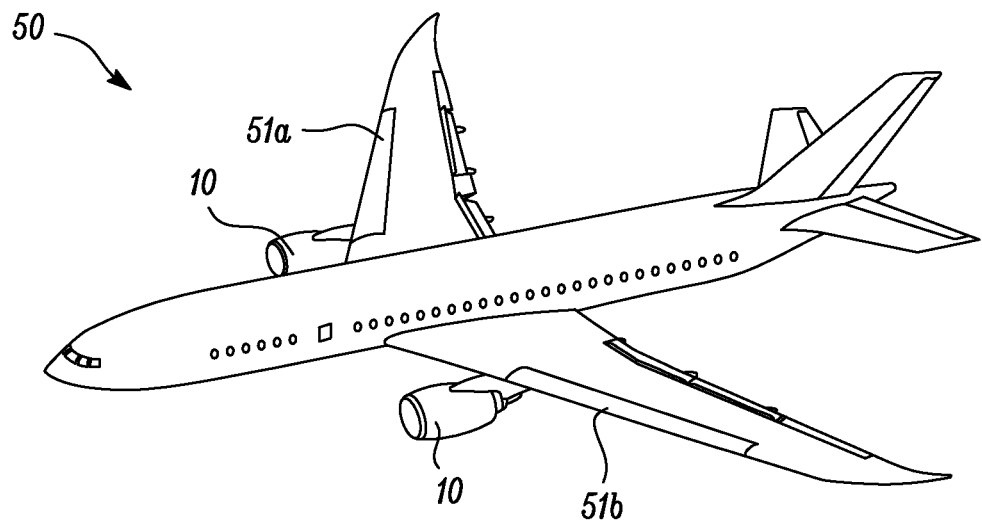
FIG. 5 is a schematic drawing of an aircraft having a gas turbine engine mounted thereon.

FIG. 5 illustrates an example aircraft 50 having a gas turbine engine 10 attached to each wing 51a, 51b thereof. When the aircraft is flying under cruise conditions, as defined herein, each gas turbine engine 10 operates such that a jet velocity ratio between a first jet velocity exiting from a bypass duct of the engine 10 and a second jet velocity exiting from an exhaust nozzle 20 of the engine core is within a range from around 1.0 to around 1.3.

Figure 6:
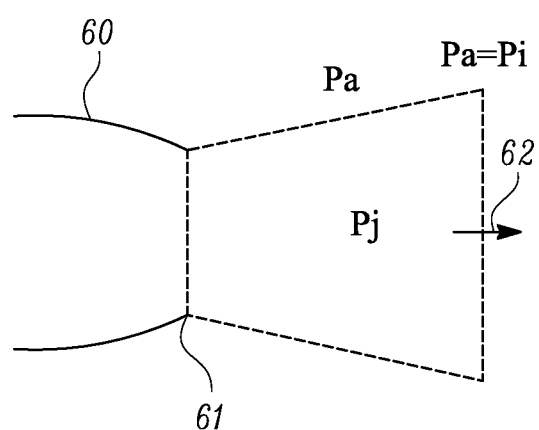
FIG. 6 is a schematic drawing illustrating the concept of a fully expanded jet velocity.

FIG. 6 illustrates an example exhaust nozzle 60 of a gas turbine engine. The pressure Pj at the exit or throat 61 of the exhaust nozzle 60 is greater than the ambient pressure Pa around the engine. At some distance away from the nozzle exit 61 the jet pressure will equalise with the ambient pressure, i.e. Pj=Pa. The fully expanded jet velocity is defined as the jet velocity 62 at this point, i.e. the jet velocity along the axis of the engine at a minimum distance from the exhaust nozzle where the pressure is equal to ambient pressure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of operating a gas turbine engine on an aircraft, the gas turbine engine comprising:
 an engine core comprising a turbine, a compressor, and a core shaft connecting the turbine to the compressor;
 a fan located upstream of the engine core, the fan comprising a plurality of fan blades; and
 a gearbox that receives an input from the core shaft to drive the fan at a lower rotational speed than the core shaft, wherein
 the method comprises operating the gas turbine engine to provide propulsion under cruise conditions such that a product of a jet velocity ratio RJ and a gear ratio of the gearbox is between 2.4 and 4.7,
 the jet velocity ratio, RJ, is determined by the following formula:

$$R_J = \frac{V_B C_B}{V_C C_C \eta_{LPT} \eta_F}$$

where $V_B$ is the fully expanded first jet velocity, $C_B$ is a thrust coefficient of the bypass nozzle, $V_C$ is the fully expanded second jet velocity, $C_C$ is a thrust coefficient of the core exhaust nozzle, $\eta_{LPT}$ is an isentropic efficiency of a lowest pressure turbine of the engine core and $\eta_F$ is an isentropic efficiency of compression of air into the bypass duct by the fan, and the bypass ratio is in the range 13 to 16.5, the bypass ratio being defined as defined as the ratio of the mass flow rate of the flow through the bypass duct to the mass flow rate of the flow through the core at the cruise conditions.

2. The method of claim 1, wherein the gear ratio is between 3.4 and 4.2.

3. The method of claim 1, wherein the gear ratio is between 3.2 and 4.2, and the product is between 2.4 and 4.2.

4. The method of claim 1, wherein the gear ratio is between 3.2 and 3.8.

5. The method of claim 1, wherein the gear ratio is between 3.2 and 3.8, and the product is between 2.4 and 3.8.

6. The method of claim 1, wherein the jet velocity ratio is within a range from 0.75 to 0.82 at cruise conditions.

7. The method of claim 1, wherein the bypass ratio is in the range from 13.0 to 16.0.

8. The method of claim 1, wherein the bypass ratio is in the range from 13.0 to 15.5.

9. The method of claim 1, wherein the bypass ratio is in the range 13.0 to 14.5.

10. The method of claim 1, wherein the gearbox is an epicyclic gearbox comprising an input sun gear connected to the core shaft, a plurality of planetary gears connected by a carrier arm and an outer annulus ring, the fan being connected to the carrier arm.

11. The method of claim 1, wherein the fan has an outer diameter of between 220 cm and 390 cm.

12. The method of claim 1, wherein the fan has an outer diameter of around 220 cm.

13. The method of claim 11, wherein the fan has an outer diameter of between 330 cm and 380 cm.

14. The method of claim 1, wherein
the turbine is a first turbine, the compressor is a first compressor, and the core shaft is a first core shaft;
the engine core further comprises a second turbine, a second compressor, and a second core shaft connecting the second turbine to the second compressor; and
the second turbine, the second compressor, and the second core shaft rotate at a higher rotational speed than the first core shaft.

15. The method of claim 1, wherein the jet velocity ratio RJ is between 0.75 and 1.

16. The method of claim 1, wherein each fan blade has a carbon-fibre body.

17. The method of claim 1, wherein each fan blade has a protective leading edge.

18. The method of claim 17, wherein the protective leading edge is manufactured using titanium or a titanium-based alloy.

19. The method of claim 1, wherein the rotational speed of the fan at the cruise conditions is less than 2500 rpm.

20. The method of claim 1, wherein the fan has an outer diameter in the range 220 cm to 300 cm, and the rotational speed of the fan at the cruise conditions is 1700 rpm to 2500 rpm.

* * * * *